United States Patent [19]

Mendoza

[11] 3,859,452

[45] Jan. 7, 1975

[54] METHOD FOR OBTAINING NIXTAMALIZED FLOURS

[76] Inventor: Fausto Celorio Mendoza, Cumbres de Acultzingo No. 185, Lomas-de-Chapultepec, Mexico 10, D.F., Mexico

[22] Filed: Apr. 22, 1974

[21] Appl. No.: 462,800

Related U.S. Application Data

[62] Division of Ser. No. 268,482, July 3, 1972, abandoned.

[52] U.S. Cl.................... 426/375, 426/208, 99/485
[51] Int. Cl............................................... A23l 1/10
[58] Field of Search............ 426/373, 375, 442, 443

[56] References Cited
UNITED STATES PATENTS 1,010,202    11/1911    Thomas ............................ 426/463
3,117,868    1/1964     Madrazo et al..................... 426/355
3,369,908    2/1968     Gonzalez et al.................... 426/373
3,489,569    1/1970     Shreve et al........................ 426/463

*Primary Examiner*—Raymond N. Jones
*Attorney, Agent, or Firm*—Albert L. Jeffers; Roger M. Rickert

[57] ABSTRACT

A method and apparatus for treating corn flour and the like in the presence of a nixtamalizing agent in which the flour together with the said agent is moved upwardly through a treatment chamber with the simultaneous application of heat so that the flour is treated in the steam generated by the water driven therefrom by the heat and thereafter the flour is cooled and reabsorbs the moisture and is collected in a suitable container.

5 Claims, 1 Drawing Figure

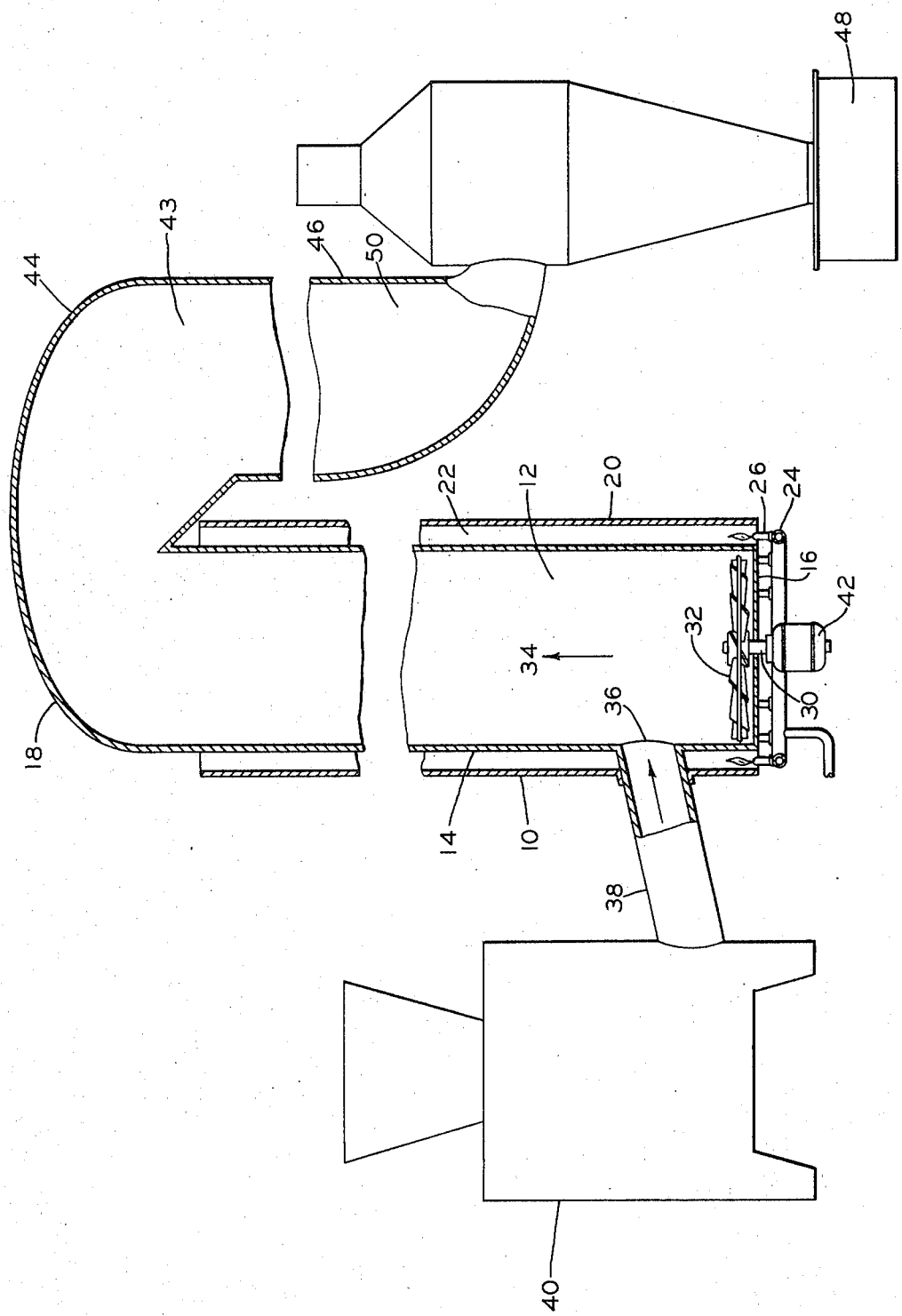

METHOD FOR OBTAINING NIXTAMALIZED FLOURS

RELATED APPLICATION

The present application is a continuation-in-part of my copending application, Ser. No. 268,482; filed July 3, 1972 now abandoned.

The present invention relates to a method and apparatus for treating flour, in particular, corn flour, and is especially concerned with a method and apparatus for treating the flour in the absence of added water to effect nixtamalization thereof.

Nixtamalization as practiced by the Indians of Mexico resides in steeping the grain in limewater for some time while the solution is being heated. The pericarp of the grain is thereby softened and a chemical reaction takes place. The solution is then drained off, and the softened grains are milled or ground into a masa or moist dough from which the tortillas are made.

In Mexican Pat. No. 88,438, a method is disclosed for treating corn flour to obtain what was referred to as "nixtamalized" flour by means of a dry process as opposed to the traditional wet process referred to above. In the process disclosed in the patent, however, the grain being treated is ground in a grinding apparatus provided with devices to permit accurate control of the temperature so that the material being treated is constantly maintained, during the entire operation, at a temperature within the range of about 80° C to about 120° C.

With the foregoing in mind, a particular object of the present invention is the provision of a method and apparatus for nixtamalizing flours in which heat is employed but which permits the grain to be ground in a conventional unheated grinding device.

A further object of the present invention is the provision of a method and apparatus of the nature referred to in which the flour is treated immediately after it leaves the grinder and in the absence of added water.

Still another object of the invention is the provision of a method and apparatus which is highly efficient and which can operate continuously thereby providing for high production rates.

The foregoing objects as well as still other objects and advantages of the present invention will become more apparent upon reference to the following specification taken in connection with the accompanying drawing which is a schematic view of an apparatus according to the present invention for carrying out the method of the present invention and is partly in section.

BRIEF SUMMARY OF THE INVENTION

According to the present invention, a first chamber is established having an inlet near the bottom and an outlet near the top with a fan in the bottom of the chamber causing upward circulation of air therethrough. Heat is supplied to the chamber and flour, preferably newly ground flour, is admixed with lime and supplied to the inlet and is carried upwardly by the air to the outlet and discharged from the outlet. The temperature in the chamber may range from about 80° C to about 120° C.

During the movement of the flour upwardly through the chamber, the heat supplied to the chamber drives water from the flour. This water changes to steam and humidifies the air and wets the lime and thereby effects treatment of the flour so that it becomes nixtamalized as is known. After the now nixtamalized flour has left the outlet, it is supplied to a cooling chamber where the air and flour cool so that at least a substantial portion of the steam in the air condenses and is absorbed by the flour with the cooled flour and cooled air being separately discharged from the cooler.

The flour is of a particle size which can range from about 30 mesh downwardly and is arrived at by grinding corn in any sort of grinding apparatus capable of reducing the corn to the size referred to.

The flour which enters the inlet of the heated chamber has lime added thereto in sufficient amount to effect the nixtamalization of the flour, say, up to about 0.04 wt percent lime, and advantageously ascends in the chamber in a helical path thereby exposing the flour fully for treatment and avoiding roasting of the flour in the chamber.

The chamber is preferably heated by surrounding the chamber with a jacket and supplying a heating medium thereto which, in a preferred embodiment of the invention, is in the form of gas burner means supplying heat to the bottom of the space surrounded by the jacket.

The single FIGURE is a view, in partial section, and partially schematic of the apparatus illustrating the present invention.

DETAILED DESCRIPTION OF THE INVENTION

Referring to the drawing somewhat more in detail, the treatment zone of the apparatus in which the material is treated by the application of heat is generally indicated at 10 and comprises an inner vertically elongated substantially cylindrical chamber 12 having a vertical wall 14 and a bottom wall 16. Chamber 12 may be about 28 inches in diameter. The chamber 12 is several feet in height, say, 6 or 7 feet, but can vary in height. The height of chamber 12 is selected to give ample time for the treatment of the flour to be carried out. As brought out in U.S. Pat. No. 3,369,908, treatment time for the corn is only a few minutes at elevated temperatures. The top wall 18 of chamber 12 is inclined toward one side of the chamber and directs material rising in the chamber toward a side opening through which the material is discharged from the chamber.

An outer jacket 20 is arranged in radially spaced relation to chamber 12 and defines therewith an annular space 22 to which heat is supplied at the bottom by a ring-like manifold 24 having gas nozzles 26 on the top. The annular space 22, it will be noted, is also open at the top so that the hot gases rise upwardly and heat substantially the entire vertical length of chamber 12. Other heating devices, including steam heating or liquid heat transfer arrangements or electrical heating devices are all possible for supplying heat to chamber 12.

Chamber 12 includes an inlet 36 near the bottom to which is connected the upwardly inclined chute 38 leading from a grinding apparatus 40.

Near the bottom of chamber 12 is a fan 32 mounted on vertical shaft 30 extending through bottom wall 16 of the chamber and connected to be driven by an electric motor 42.

In operation, rotation of fan 32 will produce vertical movement of air in chamber 12 as indicated by arrow 34. This vertical movement of air in chamber 12 will be a swirling, turbulent movement and will entrain flour entering the chamber at inlet 36 and impel it upwardly in chamber 12 with a vertical swirling movement. During this movement of the flour, water is driven off from the flour. The driven off water is converted to steam and moistens the lime in the flour during the travel of the flour and lime upwardly through the chamber. The flour may be in chamber 12 a period of time ranging from about 5 minutes up to about 10 minutes, but this time may vary depending on the particular corn being treated and the age of the corn.

Humidity control elements can be provided in connection with chamber 12 according to well known practices and the humidity therein controlled by the addition of further air into the chamber at controlled humidity, say, about 10 to 12 percent and, preferably, at controlled temperature.

The flour, which is admixed with sufficient lime to bring about the nixtamalization thereof in accordance with known practices, leaves the chamber 12 near the top toward the right and enters a conduit 43, being directed thereto, as aforesaid, by the inclined top wall 18 of chamber 12. The conduit 43 also has an inclined top wall 44 so that particles leaving chamber 12 and striking wall 44 will be deflected downwardly into conduit 43. Near the lower end, conduit 43 has an inwardly tapering portion 50 that opens laterally into a cyclone separator which, at the bottom, has a collecting receiver 48 for flour and at the top has a discharge opening for air. Conduit 43 on the side facing the separator has a substantially vertical wall 46.

The separating device to which the treated flour and air is supplied from conduit 43 can, as mentioned, take the form of a cyclone separator with the conduit 43 supplying the flour and air tangentially into the separator to effect the well known rotary movement within the separator leading to the effective separation of the flour from the air in which it is entrained. The treatment lime will, as is known, remain in the flour and is depended on to retard spoilage while giving the flour the traditional flavor. During the treatment of the flour in the heated zone of the apparatus, the lime reacts with the flour, especially the hull portion of the grain to increase the nutritional value of the flour.

The corn to be treated is reduced to a desired particle size by any known grinding mechanism such as a stone mill, disc mill, hammer mill, cylinder mill, or the like, and is preferably passed directly along chute 38 into chamber 12 wherein it will be impelled upwardly along a helical path to the outlet from the chamber while simultaneously being treated at a regulated temperature. The corn may have up to about 0.04 wt percent lime added thereto during the reduction of the corn.

After the flour and the humid air in which it is entrained leaves chamber 12 and enters conduit 43, the flour and air will commence to cool so that the flour will regain a substantial portion of the water content that was driven therefrom in chamber 12.

In practice, it has been found that a flour having a moisture content of about 12 percent when leaving grinder 40 also has a moisture content of about 12 percent when it is later collected in receiver 48.

The interior of chamber 12, as mentioned, is maintained up to around 150° C, and it has been found that this causes the flour entering chamber 12 at inlet 36 to reduce in moisture content down to about 6 or 7 percent while the flour is in chamber 12 thereby freeing sufficient water from the flour to humidify the air and moisten the lime and effect the treatment referred to, namely, the nixtamalization thereof by the lime, while preventing the flour in chamber 12 from being burnt or roasted.

It will be understood that the air rising in chamber 12 could itself be brought to the chamber in a heated state rather than supplying all of the heat to the inside of chamber 12 through the wall thereof. Further, the air supplied to chamber 12 could be adjusted in humidity, or moisture content, if so desired, prior to the supply thereof to the chamber.

The apparatus according to the present invention and the method practiced by the use of the apparatus is of advantage because a simple grinding operation is carried out in a conventional grinder to reduce the corn to the desired size and all of the treatment of the materials by heat, in the presence of the added lime, is accomplished in the treatment zone established by chamber 12. This makes the apparatus less expensive to build and less troublesome to service and maintain and permits the treatment to proceed as a continuous cycle.

Processes of nixtamalizing corn are disclosed in U.S. Pat. Nos. 3,117,868 and 3,369,908, but in both of these patents the process is a wet process utilizing added water. The process of the present invention efects the nixtamalization of the corn without the use of added water but, instead, utilizes the moisture released from the ground corn during heating to provide the water needed during the chemical treatment of the corn by the lime. The particular amount of lime needed will vary with the corn and can be determined by treating a small batch of the corn.

Modifications may be made within the purview of the appended claims.

What is claimed is:

1. A method of nixtamalizing corn flour which comprises; supplying the flour with lime admixed therewith to the lower region of a vertically extending treatment zone, moving air in said treatment zone from the lower region thereof upwardly to cause the flour to rise upwardly therein, supplying heat to said treatment zone to heat the flour to a predetermined temperature to drive water therefrom which will turn to steam and humidify the said air and moisten the lime and thereby effect treatment of the flour in said treatment zone, withdrawing treated flour and humid air at the upper region of said treatment zone, immediately supplying the thus withdrawn flour and humid air to a cooling zone, and cooling the withdrawn flour and humid air in said cooling zone to cause condensation of the steam and absorption of at least a substantial part of the resulting water in said cooled treated flour.

2. A method according to claim 1 in which said mixture is introduced into said treatment zone along an upwardly inclined path.

3. A method according to claim 1 in which said air is caused to move upwardly in said treatment zone with simultaneous rotary motion whereby to carry said mixture upwardly in the treatment zone along a helical path.

4. A method according to claim 1 which includes grinding corn to form said flour immediately prior to supplying the flour to said treatment zone.

5. A method according to claim 1 in which the withdrawing of treated flour and humid air from the upper region of said treatment zone is accomplished by deflecting the treated flour and humid air laterally out of the range of said treatment zone, and into said cooling zone, collecting the cooled treated flour at the bottom of said cooling zone, and discharging air from the top of said cooling zone.

* * * * *